Figure 1:
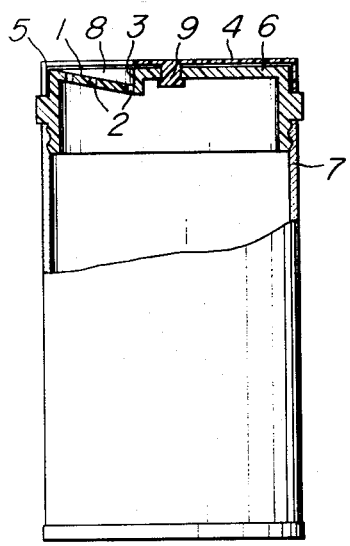

Jan. 18, 1966 SUNAO TORII ETAL 3,229,867
SHAKER CONTAINER
Filed Sept. 3, 1964 2 Sheets-Sheet 1

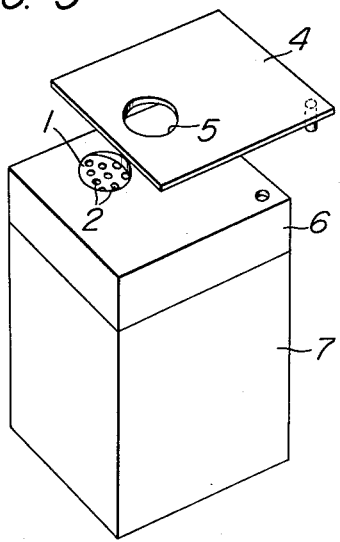

United States Patent Office 3,229,867
Patented Jan. 18, 1966

3,229,867
SHAKER CONTAINER
Sunao Torii, Amagasaki-shi, and Masao Hashimoto, Tokyo, Japan, assignors to Asahi Kasei Kogyo Kabushiki Kaisha, Osaka, Japan, a corporation of Japan
Filed Sept. 3, 1964, Ser. No. 394,110
Claims priority, application Japan, Sept. 6, 1963, 38/65,807
4 Claims. (Cl. 222—480)

The present invention relates to an improved shaker container for minute granules of crystal, powder or the like.

In shaker containers with conventional outer covers the shaker opening is in contact with the outer cover and in rotating the outer cover any granules which remain on the shaker opening become ground and crushed and dispersed, and therefore the container itself is not only soiled, but also the shaker opening is blocked and the granules are prevented from being discharged while the outer cover is unmovable.

The shaker container according to the present invention entirely removes these defects.

In accordance with the invention there is provided a shaker container which comprises a main container body and an intermediate cover on the container body, having a generally level upper surface. An outer cover is rotatably mounted on the intermediate cover. The intermediate cover includes a shaker opening which is constituted of an inwardly depressed inclined portion which covers less than half the area of the surface of the intermediate cover. The inclined portion is planar and is provided with a plurality of holes. The inclined portion extends inwardly from the periphery of the intermediate cover and is downwardly inclined away from the surface of the intermediate cover. The intermediate cover includes a step which joins the inclined portion with the remainder of the intermediate portion, whereby there is defined a space above the shaker opening between the inclined portion and the level of the upper surface. The outer cover has an opening therein similar in shape and substantially equal in size to the shaker opening and is adapted for registering with the shaker opening to enable discharge of material from said shaker. By virtue of the inclined portion and the space thereabout, when the outer cover is rotated to its closed position, any granular contents remaining on the inclined portion will move towards the lowest level thereof and drop into the main container body through the holes and will not be entrapped between the outer cover and the intermediate cover.

Preferably some of the holes are located immediately adjacent the step.

The container body may be circular and the outer cover may include a downwardly depending peripheral flange which encircles the intermediate cover. In order to secure the outer cover on the intermediate cover, there is provided on the outer cover a central shaft which extends through the intermediate cover.

The container may also be non-circular, in which case the outer cover is constituted of a flat plate and includes a downwardly projecting shaft which extends through the intermediate cover and rotatably secures the outer cover on the intermediate cover.

Figure 3:
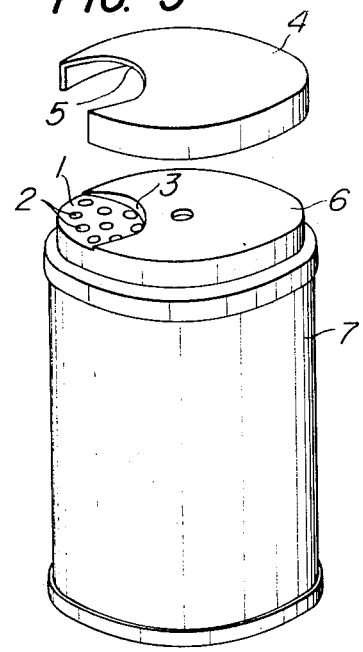
Figure 2:
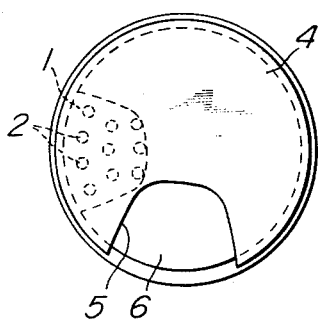
Figure 4:
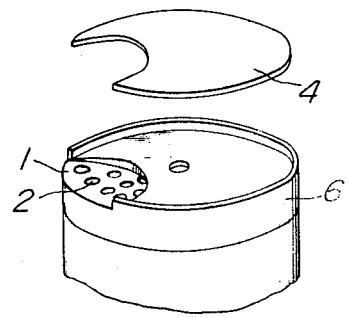

The present invention will next be described with reference to the accompanying drawing wherein:

FIG. 1 shows a partial vertical sectional view of the shaker container according to the present invention, FIG. 2 is a top view thereof, FIG. 3 is a perspective view thereof with its cover removed, FIG. 4 is a perspective view of another embodiment according to the present invention similar to that of FIG. 3, and FIG. 5 is a perspective view of still another embodiment according to the present invention which is square in section.

In FIGS. 1 and 3 a shaker opening 1 having a plurality of holes for discharging granular content is formed as a part of an intermediate cover 6 and the intermediate cover 6 is affixed to the main body 7. The area occupied by the shaker opening is, as illustrated in FIG. 2, less than one-half of the total area of the outer surface of the intermediate cover, and the shape of the opening may be semi-circular, fan-shape, square or any other form that is appropriate. On top of the intermediate cover an outer cover 4 is fitted in contact therewith, having a cut-off portion 5 substantially similar to the shaker opening 1 in shape and equal in size, and smoothly rotatable in contact with a outer surface of the intermediate cover 6. In the illustrated embodiment, the outer cover 4, is secured to the intermediate cover 6 by means of a supporting means such as shaft 9, such that the cover 6 is not detached upwardly when it is rotated. In the case of the embodiment shown in FIG. 4 or FIG. 5 the intermediate cover may be of a simple flat plate without a peripheral flange. A recessed step 3 is provided so as to make the upper surface of the shaker opening lower than the upper surface of the intermediate cover 6, that is, the shaker opening forms a recess the upper surface of the shaker opening being an inclined surface as illustrated in FIGS. 1 and 3, and thereby a space 8 is provided in a portion of the shaker opening 1 when the outer cover is fitted on the intermediate cover. By this form of construction when the shaker opening 1 and the cut-off portion 5 of the outer cover are matched by rotating the outer cover 4, the granular contents remaining on the upper surface of the shaker opening 1 are not grindingly crushed by the inner surface of the outer cover 4. The inclined surface of the shaker opening may include a horizontal surface in an extreme instance.

By having some of the discharge holes formed on the lowest portion of the inclined surface of the shaker opening along the wall of the recessed step 3 as shown in FIGS. 1 and 2 the granular contents remaining on the surface of the shaker opening 1 may easily fall into the container, and in consequence the surface of the shaker opening will always be maintained effectively. This will be important when the granular content is hygroscopic (moisture-absorptive).

In the embodiments so far described, the intermediate cover 6 can be detached from the main body 7 of the container, however, the intermediate cover 6 may be formed integrally with the upper portion of the main body.

The material for the main body, the intermediate cover, and the outer cover may be metal, synthetic resin or the like selected appropriately according to the case.

The shaker container according to the present invention, enabling the smooth discharge of a granular content performed, may be employed as a shaker of all granular substances such as salt, spices, seasonings, sugar, juice essences in powdered form, shaking food, insecticide powders, cleaning materials in powder form, cleansers, flour, talcum powder and the like.

What is claimed is:

1. A shaker container comprising a main container body, an intermediate cover on the container body having a generally level upper surface, and an outer cover rotatably mounted on the intermediate cover, said intermediate cover including an inwardly depressed inclined portion covering less than half the area of the surface of the intermediate cover, said portion being planar and provided with a plurality of holes, said portion extending inwardly from the periphery of the intermediate cover and being inclined downwardly away from the surface of the intermediate cover, said intermediate cover including a step joining the inclined portion with the remainder of the intermediate portion whereby there is defined a space above the inclined portion and the level of the upper surface, said outer cover having an opening therein similar in shape and substantially equal in size to the inclined portion and adapted for registering with the inclined portion to enable discharge of material from said shaker.

2. A shaker container as claimed in claim 1, wherein some of said holes are located immediately adjacent said step.

3. A shaker container as claimed in claim 1, wherein said container body is circular and said outer cover includes a downwardly depending peripheral flange which encircles the intermediate cover, said outer cover comprising a central shaft extending through the intermediate cover and rotatably securing the outer cover on the intermediate cover.

4. A shaker container as claimed in claim 1, wherein said container is non-circular, said outer cover being a flat plate and comprising a downwardly projection shaft extending through the intermeidate cover and rotatably securing the outer cover on the intermediate cover.

References Cited by the Examiner

UNITED STATES PATENTS

| 794,958 | 7/1905 | Symonds | 222—548 |
| 1,284,844 | 11/1918 | Wetherbee | 222—480 X |
| 3,009,610 | 11/1961 | Kubiliunas | 222—548 X |

FOREIGN PATENTS

| 18,190 | 2/1929 | Australia. |
| 1,224,377 | 2/1960 | France. |
| 1,327,182 | 4/1963 | France. |

RAPHAEL M. LUPO, *Primary Examiner.*

CHARLES R. CARTER, *Examiner.*